United States Patent [19]

Hammond et al.

[11] 4,423,121

[45] Dec. 27, 1983

[54] METAL HALOGEN BATTERY CONSTRUCTION WITH COMBUSTION ARRESTER TO PREVENT SELF PROPAGATION OF HYDROGEN-HALOGEN REACTIONS

[75] Inventors: Michael J. Hammond, Sterling Heights, Mich.; Sidika Kilic, Mystic, Conn.

[73] Assignee: Energy Development Associates, Inc., Madison Heights, Mich.

[21] Appl. No.: 316,044

[22] Filed: Oct. 28, 1981

[51] Int. Cl.$^3$ .......................................... H01M 10/36
[52] U.S. Cl. ....................................... 429/19; 429/57; 429/105
[58] Field of Search ....................... 429/17, 57, 86, 19, 429/105

[56] References Cited

U.S. PATENT DOCUMENTS

| | | | |
|---|---|---|---|
| 2,491,370 | 12/1949 | Forster | 429/86 |
| 3,464,860 | 9/1969 | George et al. | 429/57 |
| 3,713,888 | 1/1973 | Symons | 136/6 |
| 3,993,502 | 11/1976 | Bjorkman | 429/51 |
| 4,001,036 | 1/1977 | Berman et al. | 429/67 |
| 4,144,381 | 3/1979 | Fatica | 429/50 |
| 4,146,680 | 3/1979 | Carr et al. | 429/51 |

OTHER PUBLICATIONS

Section 2 of the Dec. 1981 Report Entitled "Development of the Zinc-Chloride Battery for Mobile Applications".
Section 30 of the May 1980 Report Entitled "Development of the Zinc-Chloride Battery for Utility Applications," EM-1417.
EPRI Report EM-1051 (Parts 1-3) Published Apr. 1979, by the Electric Power Research Institute.

*Primary Examiner*—Donald L. Walton
*Attorney, Agent, or Firm*—Harness, Dickey & Pierce

[57] ABSTRACT

A metal halogen battery construction containing a special reactor means having a combustion arrester device and a reaction initiator device, whereby the reactor means permits controlled recombination of hydrogen gas and halogen gas in the system to form hydrogen halide, which is then dispersed into the store means of the battery.

2 Claims, 1 Drawing Figure

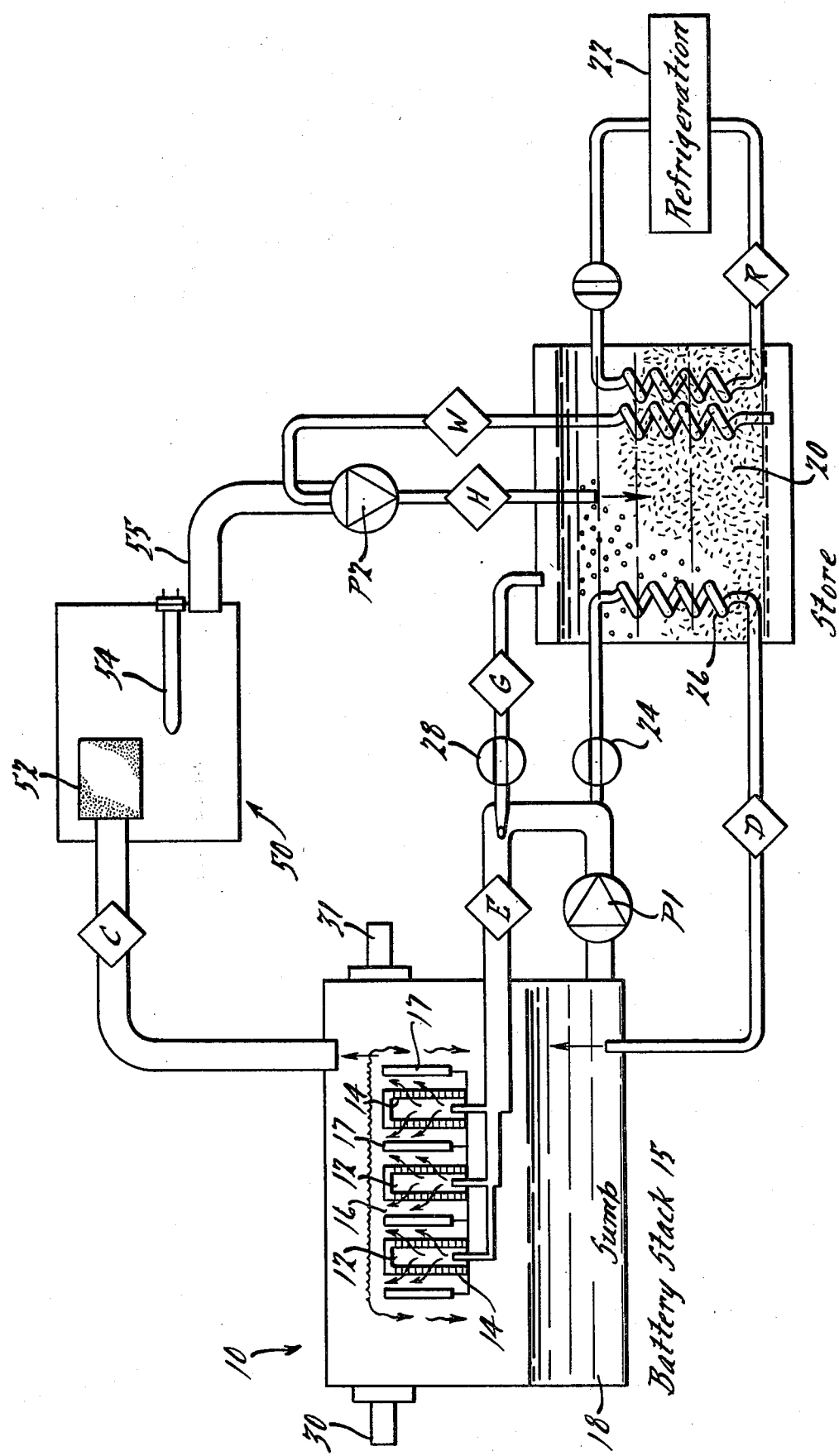

METAL HALOGEN BATTERY CONSTRUCTION WITH COMBUSTION ARRESTER TO PREVENT SELF PROPAGATION OF HYDROGEN-HALOGEN REACTIONS

BACKGROUND OF THE INVENTION

The present invention relates to an improved electrical energy storage system, and more particularly the invention relates to an improved metal halogen battery construction which includes a combustion arrester to prevent the possibility of harmful reactions between hydrogen and halogen gases which are present in the system, for example, to prevent self propagating reactions between hydrogen and chlorine gases which may be present in the system.

The electrical energy storage system of the type referred to herein (e.g., a zinc-chlorine battery system) utilizes a halogen hydrate as the source of a halogen component for reduction at a normally positive electrode, and an oxidizable metal adapted to become oxidized at a normally negative electrode during the normal discharge of the storage system. An aqueous electrolyte is employed for replenishing the supply of the halogen component as it becomes reduced at the positive electrode. The electrolyte contains the dissolved ions of the oxidized metal and the reduced halogen and is circulated between the electrode area and a storage area containing halogen hydrate which progressively decomposes during a normal discharge of the electrical energy system, liberating additional elemental halogen to be consumed at the positive electrode. Electrical energy storage systems or battery systems of this type are described in prior patents owned by the same assignee as the present invention, such as U.S. Pat. Nos. 3,713,888, 3,993,502, 4,001,036, and 4,146,680. Such systems are also described in published reports prepared by the assignee herein, such as EPRI Report EM-1051 (Parts 1-3) dated April 1979 published by the Electric Power Research Institute. The specific teachings of the aforementioned U.S. patents and the EPRI Report are incorporated herein by reference.

During the cycling of a metal halogen battery, such as for example a zinc-chlorine battery, small amounts of hydrogen are generated at the zinc electrode. The hydrogen gas is normally recombined with chlorine gas to form hydrogen chloride by means of chemical reaction (see page 15-11 of EPRI Report EM-1051). At low hydrogen concentrations (e.g., about 1-5%), the reaction proceeds smoothly. However, under certain conditions hydrogen gas may accumulate in the battery system and this can be very troublesome because, at higher hydrogen concentrations (e.g., about 10% or greater), the reaction between hydrogen and chlorine becomes self propagating, and thus there may be generated pressure fronts capable of breaking or rupturing the battery container. Moreover, previous techniques for carrying out the reaction (such as shown at page 15-11 of EPRI Report EM-1051) are not satisfactory from the standpoint that at higher hydrogen concentrations or build-ups, no provision was known which would adequately inhibit the hydrogen-chloride reaction from being rapidly propagated throughout the battery container, thus possibly leading to fracture or rupture thereof. This is a critical problem particularly with respect to the usage of such battery systems in electric vehicle applications.

Accordingly, one object of the present invention is to provide a novel battery construction technique wherein the reaction of hydrogen and halogen gases generated in the battery system can be maintained under carefully controlled conditions to avoid any possible rupture or fracture of the battery container.

Another object of the present invention is to provide a metal halogen battery system which includes a novel combustion arrester means to prevent the self propagation of hydrogen reactions, such as hydrogen-chlorine reactions.

Other objects, features and advantages of the present invention will become apparent from the subsequent description and the appended claims taken in conjunction with the accompanying drawings.

BRIEF DESCRIPTION OF THE DRAWINGS

The drawing FIGURE illustrates a schematic of the battery construction in accordance with the invention herein.

SUMMARY OF THE INVENTION

A battery system of the type referred to herein (described with respect to a zinc-chlorine battery, but other metal halogen battery systems would also be applicable), consists of three essential components: a battery stack or cell area, an electrolyte sump, and a chlorine-hydrate store. The electrolyte is an aqueous solution of zinc chloride. During charge, zinc metal is plated at the zinc electrode and chlorine gas is evolved at the chlorine electrode. The chlorine is transferred to the store where it is converted to a solid compound, known as chlorine hydrate, for storage. During discharge, the hydrate is decomposed and returned to the stack where it is subsequently reduced to chloride. In the novel battery construction discovered and disclosed herein a special reactor means is included in the gas flow line which transports the halogen gas or chlorine gas, and small amounts of any hydrogen gas formed in the cell, over to the store area, and this reactor means is constructed such that the chlorine gas and the hydrogen gas can be reacted to form hydrogen halide by controlled chemical reaction. The reactor means includes a special combustion arrester means operative to prevent self propagation of the reaction into other areas of the battery construction.

DESCRIPTION OF THE INVENTION

The drawing FIGURE illustrates a zinc-chlorine battery system designated 10 wherein means are provided to achieve the desired flows of chlorine, electrolyte, water and heat. In charge, pump P-1 delivers electrolyte to pockets 12 between pairs of porous graphite chlorine electrodes 14 in the battery stack 15. The electrolyte passes through the porous-chlorine electrodes 14 into the chamber 16 between the zinc electrodes 17 and chlorine electrodes 14, flows up between the electrodes and eventually spills through high resistance cascades back into the sump 18. Chlorine gas is pumped by the pump designated P-2 through line C. Before entering the pump P-2, the chlorine is mixed with chilled water which passes through line W and comes from the bottom of the store 20. The chlorine and chilled water are mixed in the gas pump P-2, chlorine hydrate forms, and the chlorine hydrate-water mixture is deposited in the store 20 through line H. The water in line W is chilled by passage through a heat exchanger. Glycol cooled by means of a refrigeration system 22 is passed through line R into the heat exchanger.

In discharge, the valve 24 in line D is opened, permitting a stream of warm electrolyte to pass through a heat exchanger 26 in the store. Chlorine is formed by decomposition of chlorine hydrate in the store 20. On development of the required pressure in the store, the valve 28 in line G is opened and the chlorine passes into line E on the higher pressure side of the electrolyte pump P-1. The chlorine dissolves in the electrolyte which is then fed to the porous graphite chlorine electrodes 14. The battery stack 15 can now be discharged, wherein electrode dissolution of the zinc occurs at the zinc electrode 17, reduction of the dissolved chlorine occurs at the chlorine electrode 14, power is available at the battery terminals 30, 31 and zinc chloride is formed in the electrolyte by reaction of zinc and chlorine to form zinc chloride.

As noted earlier herein, during cycling of the battery small amounts of hydrogen are generated at the zinc electrode. Under certain conditions, the hydrogen may accumulate in the system which can create a hazardous situation, which if not accounted for could lead to a self propagating reaction between hydrogen and chlorine, leading to possible rupture or fracture of the battery case. In accordance with this invention, the hydrogen is recombined by reaction with chlorine gas in a special reactor means designated 50 to form hydrogen chloride. The operation of the reactor means 50 is now to be described. Firstly to describe the overall flow path, the hydrogen chloride once formed by reaction in the reactor 50 is carried along, with excess chlorine gas which remains, into the gas pump P-2, from which the hydrogen chloride is eventually transmitted into the store and dissolved therein.

The reactor 50 includes a combustion arrester device 52 and a reaction initiator device such as the fluorescent light designated 54 which protrudes into the reactor 50. Other reaction initiator devices may be used, such as, photochemical reaction initiator, ultraviolet light, thermal initiators, spark initiators, and free radical initiators. Some preferred examples of devices that can be used to make the combustion arrester are as follows: fritted dispersion cylinders, such as a No. 12 extra course fritted cylinder with an outside diameter of 12 mm, a stem diameter of 8 mm, and a length of 4 inches (Pyrex brand, Corning Co. No. 39533); and, a No. 12 course fritted cylinder with the same dimensions (also from Corning Co.). After the reaction has occurred in reactor 50, the exit line 55 transmits the hydrogen chloride reaction product which is formed, as well as the excess chlorine gas, on through the system to the gas pump P-2.

It is to be noted herein that the combustion arrester device in combination with the reaction initiator device uniquely operates to quench or stop the self propagation of the hydrogen chlorine reactions to other parts of the battery system. The hydrogen is thus recombined with chlorine in the reactor means 50 to form hydrogen chloride in a safe and efficient manner which avoids possibly harmful operating conditions within the battery system. Still further, in accordance with the invention it has been found that a system generally in accordance with the type described above is very successful in preventing propagation of the hydrogen-chlorine reaction to other parts of a battery system outside of the reactor means 50. Moreover such a system can be used to prevent harmful propagation of the hydrogen-chlorine reactions, and therefore, this system is believed to be uniquely appropriate for adoption in metal halogen battery systems to avoid fracture or rupturing the containers used to hold the same.

Laboratory test results were obtained in accordance with the disclosure herein, and the results are set forth in the table below:

| | Type of Combustion Arrester Means Or Flame Arrester Tested | % $H_2$ in Chlorine Required to Initiate Back Propagations | | Total Gas Flow Rate (l/min.) |
|---|---|---|---|---|
| 1. | Ceramic Saddles in 2¾" L × 2" ID pipe | >8% $H_2$ | <10% $H_2$ | 5 |
| | Ceramic Saddles in 8" L × 2" ID pipe | >8% $H_2$ | <10% $H_2$ | 5 |
| 2. | Plast-O-Matic Diaphragm Check Valve | >11% $H_2$ | <14% $H_2$ | 5 |
| 3. | Gas Dispersion Cylinder (sparger) 12 Coarse type | >20% $H_2$ | <25% $H_2$ | 5 10 |
| | Gas Dispersion Cylinder 12 Extra Coarse | >20% $H_2$ | <25% $H_2$ | 10 5 |
| 4. | 1.75–2.25 mm Bore Capillary Tube | >20% $H_2$ | | 5 |

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a zinc-chloride battery construction, the improved combination of:
    stack means for providing a plurality of cells, each of said cells having a positive electrode and a negative electrode separated by an aqueous zinc-chloride electrolyte;
    sump means for collecting and containing a supply of said electrolyte;
    store means for forming and storing chlorine hydrate from the chlorine gas generated in said stack means during the charging of said battery;
    means for circulating said electrolyte from said sump means to said plurality of cells;
    conduit means for conveying the chlorine gas generated in said stack means during the charging of said battery to said store means;
    reactor means, associated with said conduit means, for reacting the chlorine gas being conveyed to said store means with small amounts of hydrogen gas also generated in said stack means to form hydrogen chloride; and
    combustion arrester means, associated with said reactor means such that the chlorine and hydrogen gases conveyed from said stack means must first pass through said combustion arrester means when being introduced to said reactor means, for resisting the self-propagation of the hydrogen chlorine reaction from said reactor means back to said stack means, said combustion arrester means comprising a high surface area gas dispersing fritted device.

2. The invention according to claim 1, wherein the hydrogen chlorine reaction is carried out by photochemical reaction.

* * * * *